US009705947B2

(12) United States Patent
Wood et al.

(10) Patent No.: US 9,705,947 B2
(45) Date of Patent: *Jul. 11, 2017

(54) METHOD AND APPARATUS FOR CUSTOMIZED PROVISIONING OF ON-LINE APPLICATION CHANNELS

(71) Applicant: Roku, Inc., Saratoga, CA (US)

(72) Inventors: Anthony Wood, Palo Alto, CA (US);
David Stern, Los Gatos, CA (US);
David Westerhoff, Fremont, CA (US);
Bill Ataras, Portland, OR (US); Mark Goodwin, Mountain View, CA (US);
Aaron Graham, Santa Clara, CA (US);
Matt Emerson, New Orleans, LA (US);
Kevin Phillips, Los Gatos, CA (US)

(73) Assignee: Roku, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/336,480

(22) Filed: Jul. 21, 2014

(65) Prior Publication Data
US 2014/0330940 A1    Nov. 6, 2014

Related U.S. Application Data

(63) Continuation of application No. 13/180,375, filed on Jul. 11, 2011, now Pat. No. 8,788,578.

(51) Int. Cl.
*G06F 15/16* (2006.01)
*H04L 29/06* (2006.01)

(52) U.S. Cl.
CPC ...... *H04L 65/4069* (2013.01); *H04L 65/1063* (2013.01); *H04L 65/4076* (2013.01)

(58) Field of Classification Search
CPC . H04L 12/66; H04L 65/4069; H04L 65/1063; H04L 65/4076; G06F 21/00; G06F 15/16
(Continued)

(56) References Cited

U.S. PATENT DOCUMENTS 6,769,028 B1    7/2004  Sass et al.
7,493,640 B1 *  2/2009  Derrenberger ..... H04N 5/44543
                                                       725/39
(Continued)

OTHER PUBLICATIONS

International Search Report and written Opinion issued to International Patent Application No. PCT/US12/46107, Sep. 24, 2012, 6 pgs.

*Primary Examiner* — Tesfay Yohannes
(74) *Attorney, Agent, or Firm* — Sterne, Kessler, Goldstein & Fox LLP

(57) ABSTRACT

A method for a computer system includes receiving an identifier associated with a client streaming player, determining one or more attributes associated with the identifier from a data structure in response to the identifier, determining available channels from a plurality of channels that are to be made available to the client streaming player in response to the identifier, wherein available channels comprises a first channel, but not the second channel, determining a first graphical identifier associated with the first channel, providing the first graphical identifier to the client streaming player, receiving a user selection of the first graphical identifier indicating a user request to associate the first channel with the computer system, and providing an indicator of a server network address associated with the first channel to the client streaming player.

19 Claims, 8 Drawing Sheets

(58) Field of Classification Search
USPC .................................. 709/203, 231; 370/338
See application file for complete search history.

(56) References Cited

U.S. PATENT DOCUMENTS

| | | | |
|---|---|---|---|
| 8,788,578 B2* | 7/2014 | Wood | H04L 65/4069 |
| | | | 463/42 |
| 2003/0084106 A1* | 5/2003 | Erev | H04L 29/06027 |
| | | | 709/206 |
| 2003/0207698 A1* | 11/2003 | Shpak | H04L 47/245 |
| | | | 455/525 |
| 2005/0111819 A1 | 5/2005 | Cormack et al. | |
| 2006/0056311 A1* | 3/2006 | Han | H04L 29/12311 |
| | | | 370/252 |
| 2007/0038999 A1 | 2/2007 | Millington | |
| 2007/0076591 A1* | 4/2007 | Khan | H04L 12/4625 |
| | | | 370/216 |
| 2007/0162945 A1 | 7/2007 | Mills | |
| 2007/0250636 A1* | 10/2007 | Stephens | H04N 7/162 |
| | | | 709/231 |
| 2007/0250901 A1* | 10/2007 | McIntire | H04N 7/17318 |
| | | | 725/146 |
| 2008/0016540 A1* | 1/2008 | Savoor | H04N 21/25841 |
| | | | 725/112 |
| 2008/0235731 A1* | 9/2008 | Bryant | H04N 5/44543 |
| | | | 725/44 |
| 2008/0316983 A1* | 12/2008 | Daigle | H04L 29/12783 |
| | | | 370/338 |
| 2009/0094376 A1 | 4/2009 | Kosiba | |
| 2009/0100464 A1 | 4/2009 | Migos | |
| 2009/0254843 A1* | 10/2009 | Van Wie | H04L 12/1822 |
| | | | 715/757 |
| 2010/0121963 A1 | 5/2010 | Peng et al. | |
| 2010/0129052 A1 | 5/2010 | Fujinami et al. | |
| 2010/0162292 A1 | 6/2010 | Potrebic et al. | |
| 2010/0312828 A1 | 12/2010 | Besserglick et al. | |
| 2011/0014972 A1 | 1/2011 | Herrmann et al. | |
| 2011/0078720 A1* | 3/2011 | Blanchard | H04N 7/165 |
| | | | 725/25 |
| 2011/0167169 A1 | 7/2011 | Ping et al. | |
| 2011/0225312 A1 | 9/2011 | Liu et al. | |
| 2012/0066337 A1 | 3/2012 | Wu et al. | |
| 2012/0072946 A1* | 3/2012 | Cranman | H04N 21/4312 |
| | | | 725/28 |
| 2012/0128333 A1 | 5/2012 | Miyake et al. | |
| 2013/0005471 A1 | 1/2013 | Chung et al. | |
| 2013/0043995 A1 | 2/2013 | Cehelnik | |
| 2013/0132720 A1 | 5/2013 | Parsons | |
| 2013/0223539 A1* | 8/2013 | Lee | H04L 65/607 |
| | | | 375/240.25 |
| 2013/0227084 A1* | 8/2013 | Kim | H04L 65/60 |
| | | | 709/219 |
| 2014/0096165 A1* | 4/2014 | Bei | H04N 19/46 |
| | | | 725/81 |
| 2014/0335870 A1* | 11/2014 | Yilmaz | H04W 36/32 |
| | | | 455/441 |
| 2015/0036695 A1* | 2/2015 | Gowda | H04L 47/283 |
| | | | 370/474 |
| 2015/0066922 A1* | 3/2015 | Xiong | G06F 17/30038 |
| | | | 707/736 |
| 2015/0067186 A1* | 3/2015 | Kuhn | H04L 65/607 |
| | | | 709/231 |

* cited by examiner

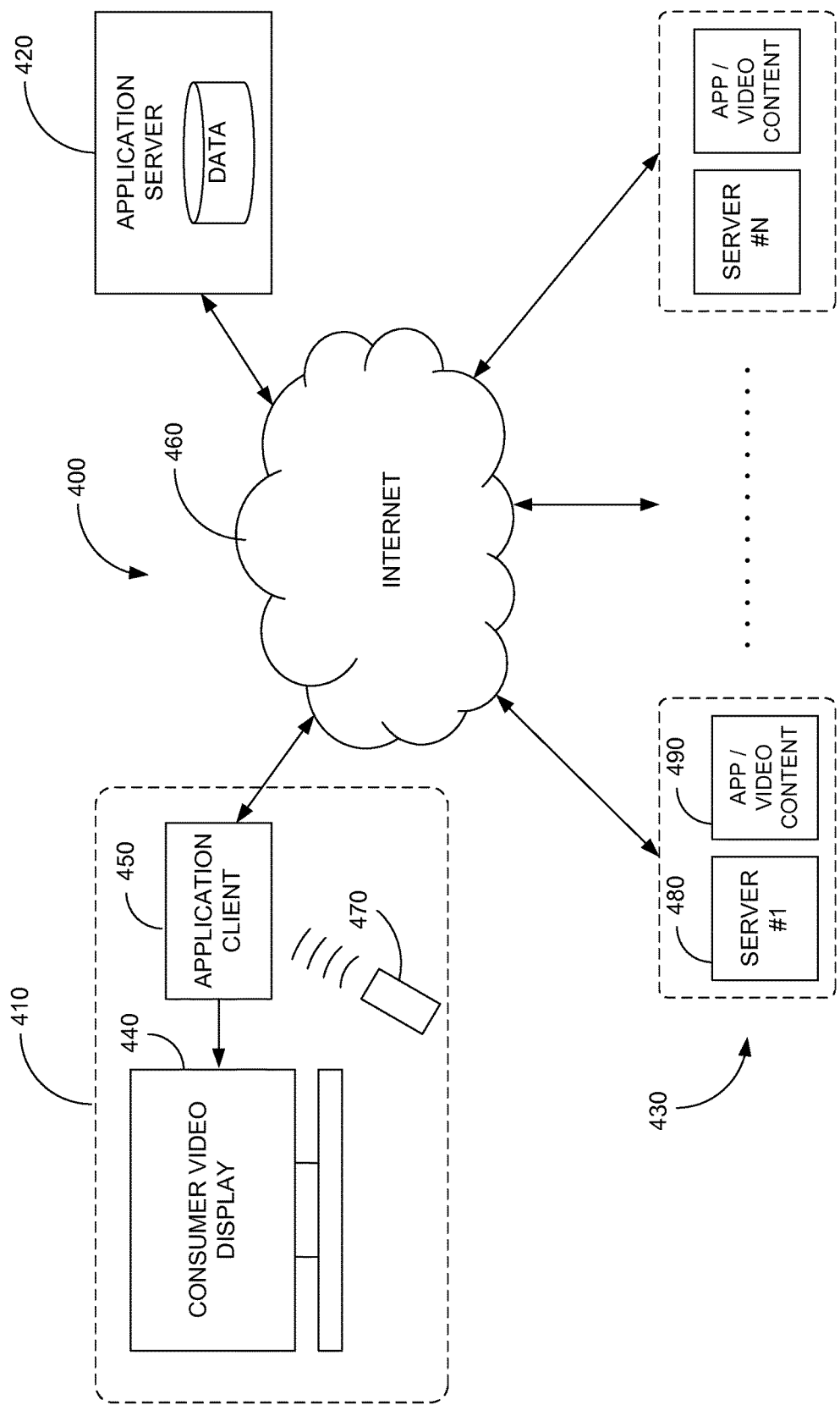

METHOD AND APPARATUS FOR CUSTOMIZED PROVISIONING OF ON-LINE APPLICATION CHANNELS

CROSS REFERENCE TO RELATED APPLICATIONS

This application is a continuation of U.S. patent application Ser. No. 13/180,375 filed on Jul. 11, 2011, the contents of which are incorporated herein by reference.

BACKGROUND OF THE INVENTION

The present invention relates to streaming media. More specifically, the present invention relates to methods and apparatus for customizing user experience in a streaming media environment.

Before the era of cable TV, the three major television networks controlled what was on TV. Even counting the availability of programming on UHF channels, the selection of shows programming was very limited. Back then, consumers desiring to view shows outside the mainstream would often lamented that "there was nothing good on TV." In the era of satellite and cable TV, hundreds of different channels of programming are now available to the consumer. These channels, however, are specifically selected by the providers from thousands of available channels. Accordingly, for a consumer desiring to view shows outside the mainstream, such consumers still feel that "there is nothing good on TV."

The inventors of the present invention believe that current satellite and cable TV user interface environments often do not provide consumers with a positive user experience. As an example, the consumer may search for a particular show and become excited to find that that show is currently playing on a particular channel. The consumer then quickly tunes to that particular channel, only to see a message that they are unauthorized to view the channel, that they are not subscribed to that channel, or the like. The consumer thus becomes disappointed. Because of this, and the high price of subscription services, it is believed that consumers grow to dislike cable and satellite TV providers. This statement is backed-up with numerous surveys in the industry regarding consumer satisfaction.

With the advent of on-demand video services, consumers can now view television shows, pay-per-view events, and recently released movies. Such on-demand video services typically rely upon a cable TV or satellite TV set-top box and a billing arrangement with the TV provider. The inventors of the present invention believe that a problem with these services, is that the consumer is assumed to already know what specific show they want to watch. Specifically, there is no third party selecting television programming (e.g. sets of shows) for the consumer. Although some services now use recommendation engines to suggest other shows the consumer may wish to view, typically these engines merely suggest to the user more of what the user is already watching.

In light of the above, what is desired are methods and apparatus that enable users to customize their television viewing experience, without the drawbacks discussed above.

BRIEF SUMMARY OF THE INVENTION

The present invention relates to streaming media. More specifically, the present invention relates to methods and apparatus for customizing user experience in a streaming media environment.

In various embodiments of the present invention, a streaming player (SP) receives video data from a computer network and outputs the video data to user display device. Initially, the SP presents the user a home page having a channel listing of programming channels they can view. If they wish to add additional programming to their channel listing, they can browse through a "Channel store." In the present patent application the term "channel" or "programming channel" typically refers to a software application written by a data (e.g. audio, video, game, screen saver, utility) provider, as will be described below. For sake of convenience, the data described below refers to "video" data, but it should be understood that embodiments cover many other types of data.

Various embodiments disclose processes whereby selections of video programming channels are determined for a user. More specifically, a streaming player (SP) associated with a user may provide a hardware identifier (electronic serial number) and/or software identifier (firmware version number) to an application server. Based upon these identifiers, the application server may determine a hardware/software configuration for the SP. Additionally, the application server may identify demographic data (including geographic data) for users associated with the SP (e.g. the owner). Based upon the hardware/software/demographic data, the application server determines video programming channels that are appropriate/available for the user's SP.

In various embodiments, once the user is presented with video programming channels that are appropriate, the user may add the video programming channel to their home page (channel listing). Subsequently, in various embodiments, when the user navigates to their home page, the user can view a channel listing and select an icon associated with the video programming channel. In response, the application server provides the SP with the URL, pointer, or the like to the network server, the SP receives video data from the video source, and then the SP plays the video to the user.

In various embodiments, video programming (e.g. application) providers may specify video programming channels, images/text or the like to describe their video programming channels such as a title of the application programming channel, a short textual description, a long textual description, screenshots of the channel, pricing information (e.g. free, pay per view, subscription, etc.) In various embodiments, the providers may also specify criteria (e.g. hardware/software/demographic) specifying which users may potentially add or subscribe to their video/application programming channels. These types of metadata submitted along with a software package is provided to the application server. Upon approval by the application server, the video programming channel is initiated.

According to one aspect of the invention, a method for a computer system comprising a processor and a memory, wherein the computer system is programmed to perform the method is disclosed. A hardware-implemented method includes receiving, with the computer system, an identifier associated with a client streaming player, and determining, with the computer system, one or more attributes associated with the identifier from a data structure stored within the memory, in response to the identifier. A process includes determining, with the computer system, available channels from a plurality of channels that are to be made available to the client streaming player in response to the one or more attributes, wherein the plurality of channels comprises a first channel and a second channel, and wherein the available channels comprise the first channel, but not the second channel, and determining, with the computer system, a first plurality of channel metadata associated with the available channels, including a first graphical identifier associated with the first channel. A hardware specific methodology may include providing, with the computer system, the first plurality of channel metadata associated with the available channels, including the first graphical identifier to the client streaming player, receiving, with the computer system, a user selection of the first graphical identifier indicating a user request to associate the client streaming player to the first channel, and providing, with the computer system, an indicator of a server network address associated with the first channel to the client streaming player.

According to another aspect of the invention, a computer system for providing feeds to a client streaming player is disclosed. An apparatus may include a memory configured to store associations between client streaming player indicators and one or more attributes, a plurality of channels comprising a first channel and a second channel. A device may include a processor coupled to the memory, wherein the processor is programmed to receive an identifier associated with a client streaming player, wherein the processor is programmed to determine one or more attributes associated with the identifier from the memory, wherein the processor is programmed to determine a first channel that is available to the client streaming player and a second channel that is not available to the client steaming player in response to the one or more attributes, wherein the processor is programmed to determine a first plurality of metadata including an indicator of a graphical icon associated with the first channel, wherein the processor is programmed to provide the first plurality of metadata including the indicator of the graphical icon to the client streaming player, wherein the processor is programmed to receive a user selection of the graphical icon from the client streaming player, and wherein the processor is programmed to provide an indicator of a source associated with the first channel to the client streaming player, in response to the user selection of the graphical icon.

According to yet another aspect of the invention, a method for a computer system comprising a processor and a memory, wherein the computer system is programmed to perform the method is described. A compute-implemented methodology may include providing, with the computer system, an identifier associated with the computer system to an application server, wherein one or more attributes are associated with the identifier within the application server, and receiving, with the computer system, a first plurality of metadata associated with available channels, including a first graphical identifier from the application server, wherein the available channels are determined from a plurality of channels in response to the one or more attributes, and wherein the available channels includes a first channel, but not a second channel, and wherein the first channel is associated with the first graphical identifier. A hardware process may include displaying, with the computer system, a graphical user interface to a display comprising the first graphical identifier, and receiving, with the computer system, a user selection of the first graphical identifier displayed on the display indicating a user request to associate the computer system with the first channel. Computer-implemented steps may include providing, with the computer system, the user selection of the first graphical to the application server, and receiving, with the computer system, an indicator of a server network address associated with the first channel from the application server.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 3 illustrates a system contemplated by embodiment of the present invention;

DETAILED DESCRIPTION OF THE INVENTION

Figure 1A:
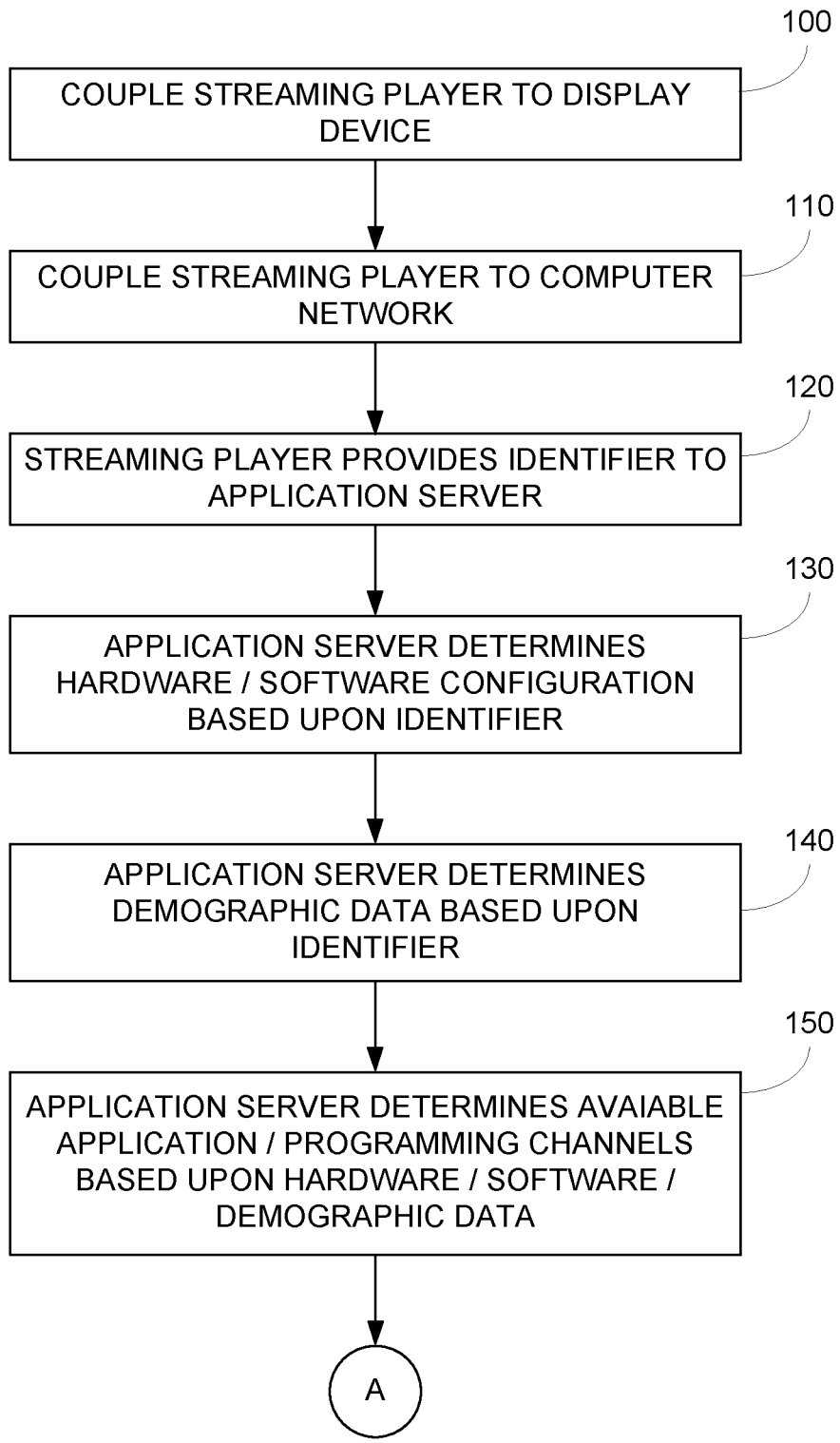
FIGS. 1A-D illustrate a block diagram of a process according to various embodiments of the present invention.

FIGS. 1A-D illustrates a block diagram of a process according to various embodiments of the present invention. More specifically, FIGS. 1A-D describe a computer implemented process performed by a computer server, a client device, or the like that are programmed accordingly.

Initially, an application client is coupled to a user display device, step 100. In various embodiments, the application client device is a streaming media player having a processor, memory, computer network interface, or the like, as described further below. In some embodiments, a streaming player known as the Roku XD, HD, SD currently marketed by Roku, Inc. may be used, and in other embodiments, other types of streaming players are also contemplated.

The streaming player is then coupled to a computer network, such as the Internet, step 110. In various embodiments, the device may be coupled via a network cable, or wirelessly, e.g. 802.11a, b, g, n, or other wireless communications protocol to a router, gateway, or the like.

Upon powering up of the SP or exiting a hibernation state, the SP is programmed to provide hardware identifying information to an application server, step 120. In various embodiments, the identifying information may include a serial number of the SP, a firmware revision number, an indicator of a model number, a combination of these numbers, or the like. In other embodiments, it is contemplated that other information may also be provided, such as the name of the user associated with the SP, the network address of the SP, ISP of the SP, user-specified settings of the SP, software or other data stored on the SP, and the like.

Next, the application server receives the identifying information and determines a hardware/software configuration associated with the SP, step 130. In various embodiments, the configuration may include an indication of specific hardware, such as the existence of an HD monitor, a graphics accelerator, a USB or other interface, a Bluetooth or other wireless interface, memory requirements, one or more hardware buttons, or the like; an indication of how memory there is, the type of the processor, the speed of the processor, the operating temperature of the SP, or the like; etc. Additionally, the configuration may include an indication of specific software parameters, such as the version of the SP operating system, whether any application software has been loaded upon the SP and any version numbers, an IP address of the SP, a Quality of Service flag, an ISP associated with the SP, programming channels subscribed to by the user, programming channels associated with the user's SP, and the like. In various embodiments, the hardware/software configuration may be retrieved from one or more database tables within a database, whereas in other embodiments, any other data construct may be used to retrieve such data.

In some embodiments, specific hardware/software identifying information may not be provided, such as firmware version, hardware version, or the like. In such cases, the application server may assume a default or basic hardware/software configuration, or the like. For example, if hardware versions include: A no USB, A with USB, B without USB, and C with USB, the default version may be A no USB; if the firmware versions include: 1.4, 2.4, and 3.0, the default version may be the lowest firmware version: 1.4, or the like.

In some embodiments, a SP serial identifier (number) is the minimum data required by the application server from the SP to uniquely identify the SP. Additionally, in some embodiments a firmware identifier is also required. In such cases, the identifiers may provided by packaging it along with some or all http requests sent to the application server.

Additionally, in various embodiments, the application server may also determiner demographic data associated with the SP, step 140. Such demographic data may include a name, zip code, street address, city, ISP, marital status, children, income, user interests, which channels are watched, the viewing duration, programs watched, time of day a program is watched, primary written/spoken language, and the like.

In various embodiments, based upon the hardware/software configuration for the SP and/or demographic data associated with the SP (collectively the user data), a list of available and published programming channels may be determined, step 150. More specifically, based upon such user data, a list of programming channels that the user may decide to associate with their SP are determined. In various embodiments, the list of programming channels may also include channels that are currently associated with the user's SP. As an example, if a user is currently associated with programming channels A and B, and it is determined that the user is also qualified (based upon the hardware/software/demographic data) to receive programming channel C, then in this step, programming channels associated with the user's SP may include A, B and C.

In various embodiments, the user data may be used to query a database, or other data construct, to determine the available, published channels to the user. In other embodiments, the database, or the like, may be queried to return a list of all published channels. Next, the user data is used as filters to determine the available channels from the superset list of all channels.

In the different embodiments described above, any number of criteria may be used to determine the list of available, published channels to the user. For example, some criteria may be based upon SP hardware considerations, such as the display processor type, display processor speed, amount of memory, the type of interfaces (e.g. Bluetooth, USB); software considerations, such as what codecs are installed (e.g. H.264, WMV), the firmware number, whether helper applications are installed (e.g. Shockwave™ or Flash™ from Adobe), whether a particular Digital Rights Management library is installed (e.g. Play Reader from Microsoft or Widevine from Google), whether a particular software application is installed (e.g. on-line and local games, Acrobat™ Viewer from Adobe), or the like. Other examples are described herein.

In various embodiments, as will be discussed below, video/application providers register their programming channels by providing metadata along with software code packages. With the metadata, the video/application providers may specify desired user hardware/software/demographic criteria required before the programming channel is available to the user, descriptions of their programming channels, images, pricing information, and the like.

Based upon the list of available channels, some or all of the metadata associated with each identified programming channels are determined, step 160. In various embodiments, the indicators may be pointers to graphical image files and/or text files, URLs to files, descriptions, screenshots, pricing information, or the like.

In various embodiments, the available channel metadata are sent to the SP, step 170, to be rendered and displayed as one or more graphical user interfaces to the user on the user's display, step 180. In some examples, the metadata may include image data which the SP directly renders as images, and some other examples, the metadata may include URLs that point to image data which the SP again renders as images. In various embodiments, the SP may present the images/text data for the available channels in any suitable graphical user interface. For example, the available channels may be displayed in a matrix/array; in a three-dimensional pile of images; or the like.

In response to the graphical user interface, the user may use a remote control, or the like, to navigate within the graphical user interface and select one or more channels to add to their channel listings, step 190. In various embodiments, SP may provide this functionality if the complete graphical user interface has been downloaded to the SP from the application server. In other embodiments, as a user navigates in first portion of the graphical user interface, the SP may receive metadata for a second portion of a graphical user interface from the application server. Accordingly, the graphical user interface may be provided to the user in any number of ways.

Figure 1B:
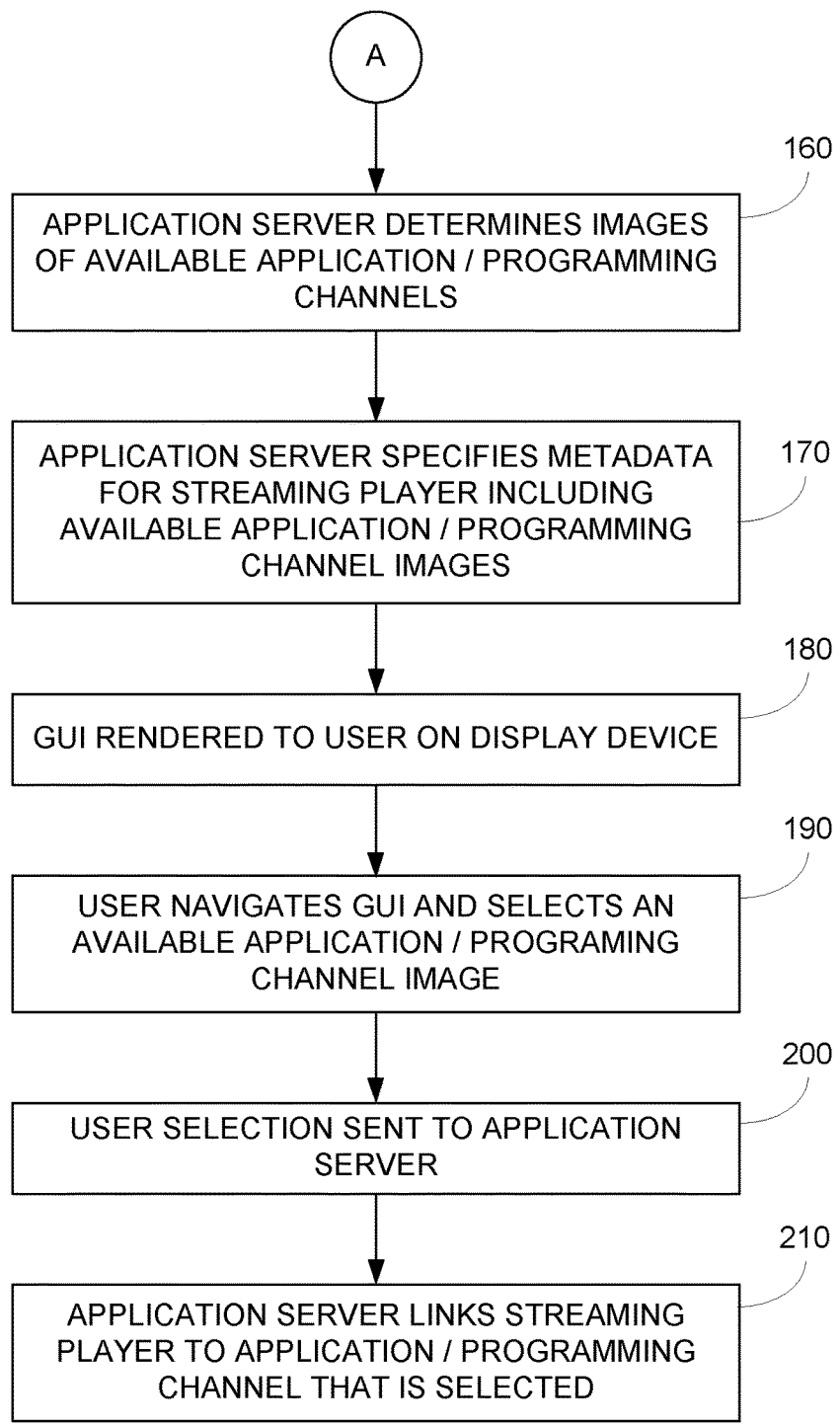
Figure 1C:
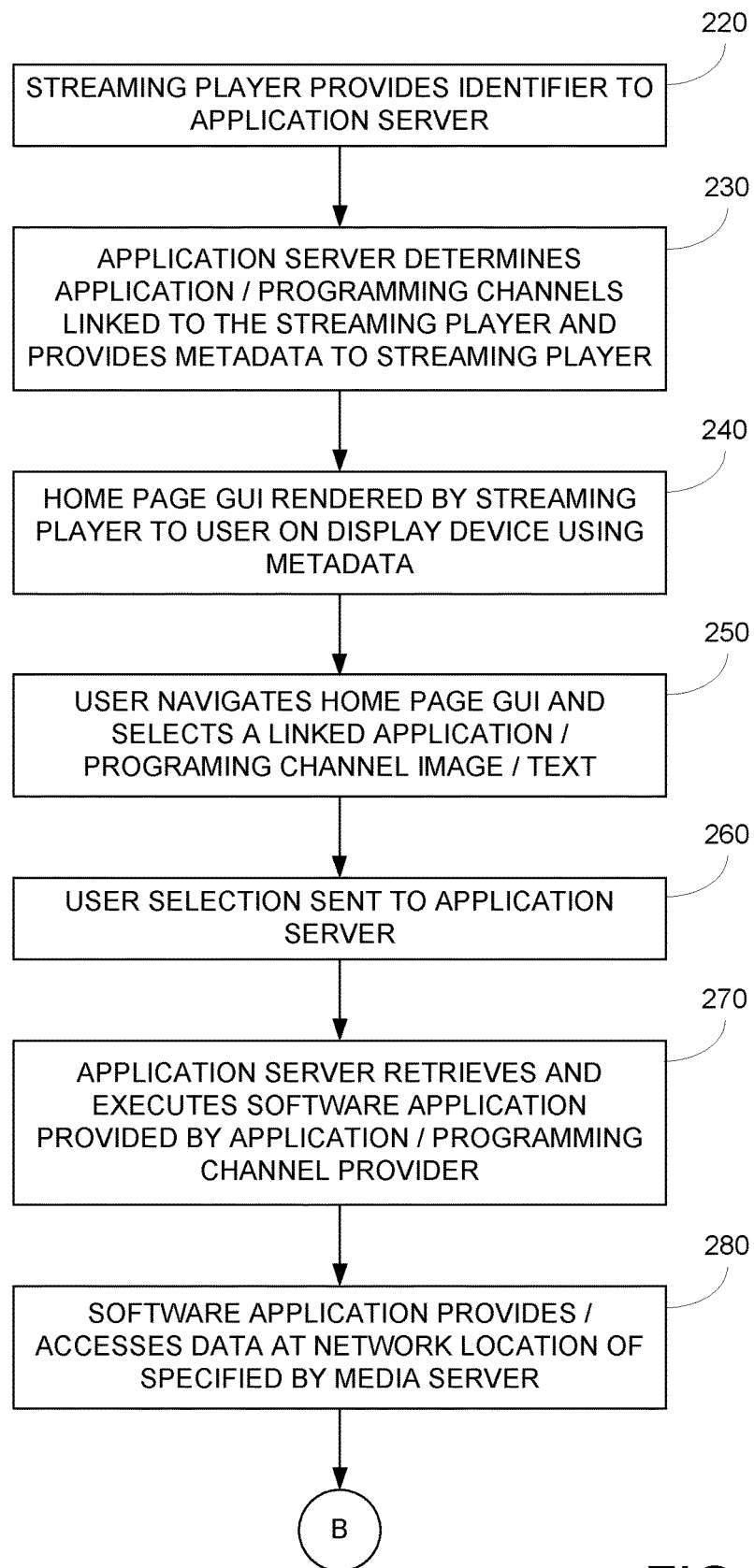
Figure 1D:
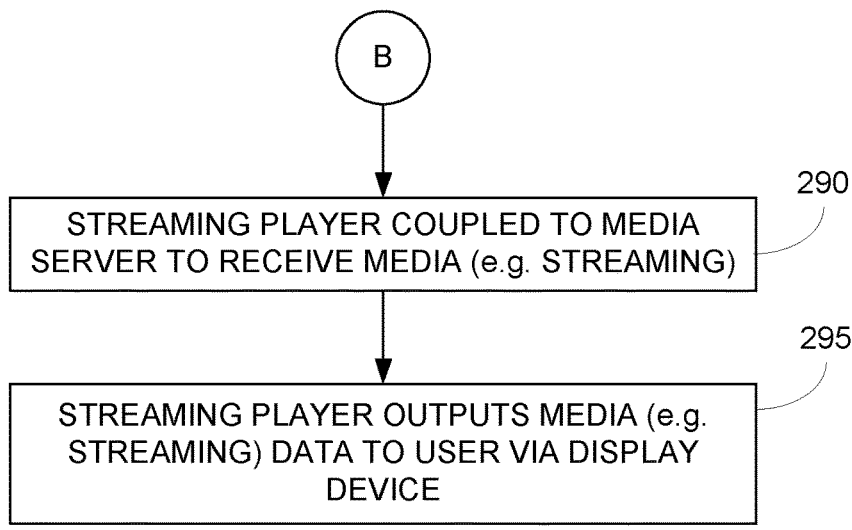

As illustrated in FIG. 1B, SP sends the user selection back to the application server, step 200, and then application server adds or stores the programming channel associated with the user selection into the database or data structure, step 210.

Subsequently, when the user desires to view their programming channels, the SP may again provide identifying information (SP configuration, demographic information, etc.) to the application server, step 220. In response, the application server determines the programming channels available to the user's SP, step 230, and provides them to the user on the user display, step 240. These steps in may be performed in a manner similar to the steps above, for example, the application server may use the identifying information to query a data base or data structure; the application server may determine metadata of associated channels, e.g. images/text/image identifiers; the application server may transfer the metadata to the SP; the SP receives the metadata and renders and displays images/text to the user; and the like.

In various embodiments, the user may make a selection of a programming channel to view by navigating in the rendered graphical user interface, and selecting an icon/text, step 250. In response, the SP relays the selection back to the application server, step 260. In various embodiments, the application server receives the selection, and executes or calls computer code provided by a provider of the programming channel, step 270. The software code then provides a pointer, video location, URL or the like to a source of video data, application data, or the like, which is then relayed back to the SP, step 280. Subsequently, the SP receives video/application data located at the pointer, video location, URL, or the like from the source of data, step 290 and displays the video/application data to the user on the user display, step 295. Subsequently, addition interaction between the SP the application server and the source of data may occur, such as user search of a database (e.g. Netflix, Youtube), or other user input of data, or the like, and response from the application server and/or the source of data.

In some embodiments of the present invention, a user may be linked to a first SP having an older hardware/software configuration, and to a second SP having a newer hardware/software configuration. In such cases, the application server may provide different available programming channels to the user based demographic data of the user and upon which SP the user is currently using. In other embodiments, the application server may provide the available programming channels to the user based upon the newest hardware/software configuration (second SP) associated with the user. In such cases, if a programming channel cannot be operated upon an older SP (first SP), a message may indicate this non-functionality to the user on the first SP.

Figure 2A:
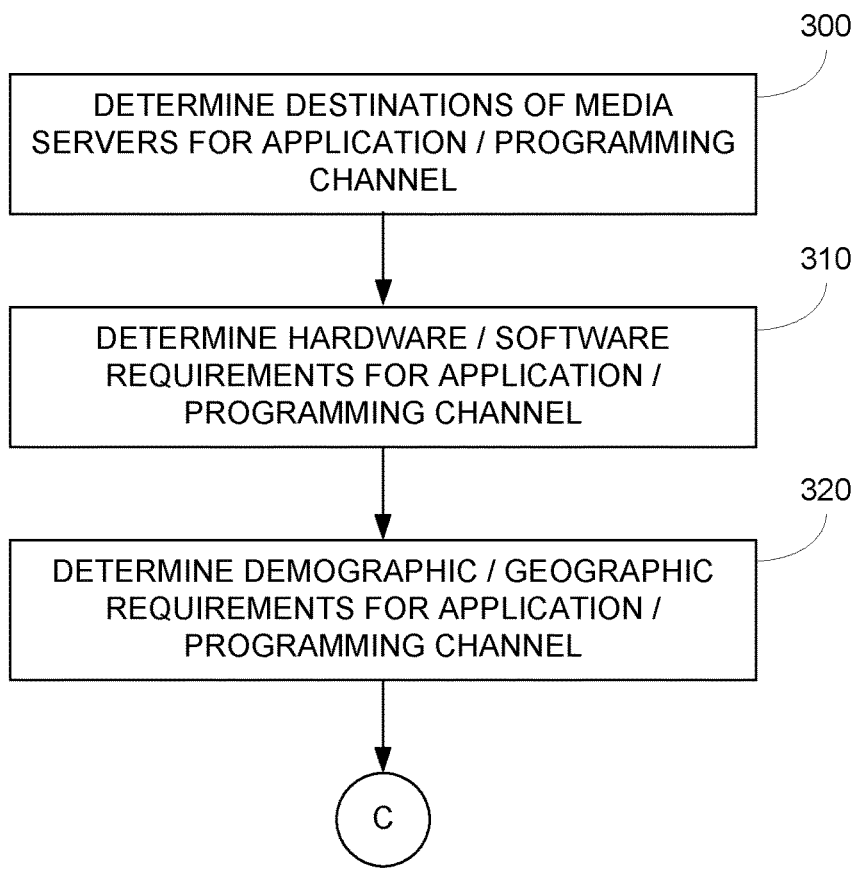
FIGS. 2A-B illustrates a block diagram of another process according to various embodiments of the present invention.

FIG. 2 illustrates a block diagram of a process according to various embodiments of the present invention. More specifically, FIG. 2 illustrates a process of a video/application provider creating a programming channel within the application server. In various embodiments, a series of application programming interfaces (APIs) are provided by the application server to enable video/application providers to create their own programming channels, as described herein. In various embodiments, a series of web pages including graphical user interfaces are provided to video/application providers to facilitate the creation of programming channels. The web pages may include one or more drop-down selections menus, or the like, to enable the video/application providers to specify to whom their programming channel may be available, such hardware version number, a firmware version number, demographic/geographic data (e.g. sex, marital status, income, interests, social network affiliation, zip code, area code, state, city, geographic region, ISP provider, etc.). Other examples of the above data are described herein.

Initially, a video/application provider may determine URLs, or network addresses of sources of video/application data programming channel, step 300. Next, the video/application provider may determine whether there are any special hardware/software configurations they require for a SP to properly play-back the video data/execute the application data, step 310. For example, the video/application provider may require a specific video codec, a specific peripheral device, a certain amount of memory, a certain controller, a USB port, HD display, or the like. Other examples of specific hardware/software options were given above.

In various embodiments, the video/application provider may also determine whether there are any demographic considerations they require for the SP to receive the video data, step 320. For example, the video/application provider may want to limit the geography where their programming channel can be played (e.g. a Sunnyvale, Calif. car dealership video channel may be limited to the San Francisco Bay area); they may want to limit the availability based upon marital status (e.g. a singles channel available to only single users); they may want to limit the availability based upon income (e.g. a luxury home channel available to only users making more than $250,000/yr); they may be contractually or legally restricted to only provide programming data based upon geographic data (e.g. an Illinois legal advice channel being only available to Illinois residents, a sports channel may only have rights to distribute live sports inside or outside a home market, etc.); they may want to target certain households (e.g. a coupon channel available only to households with two working parents); they may want to create a channel with a minimum for viewers (e.g. 21 years or older, specific TV parental guidelines, specific Movie rating); and the like.

The inventors of the present invention believe that video/application providers may surprisingly benefit by limiting the dissemination of their programming to only targeted users. This is contrary to the current thinking about videos, e.g. YouTube, where videos are deemed "successful" only if they are viewed by many people. In contrast, it is believed that benefits to having restrictions on availability of video programming channels based upon demographic/geographic data include: helping reduce the load upon the video/application provider's servers, preserving and maintaining the reputation of the video/application provider, being able to offer advertisers viewers of a particular market segment, and the like. In view of the present patent disclosure, one of ordinary skill in the art would be able to determine many other similar criteria that may be used to determine availability of a programming channel to a user.

Figure 2B:
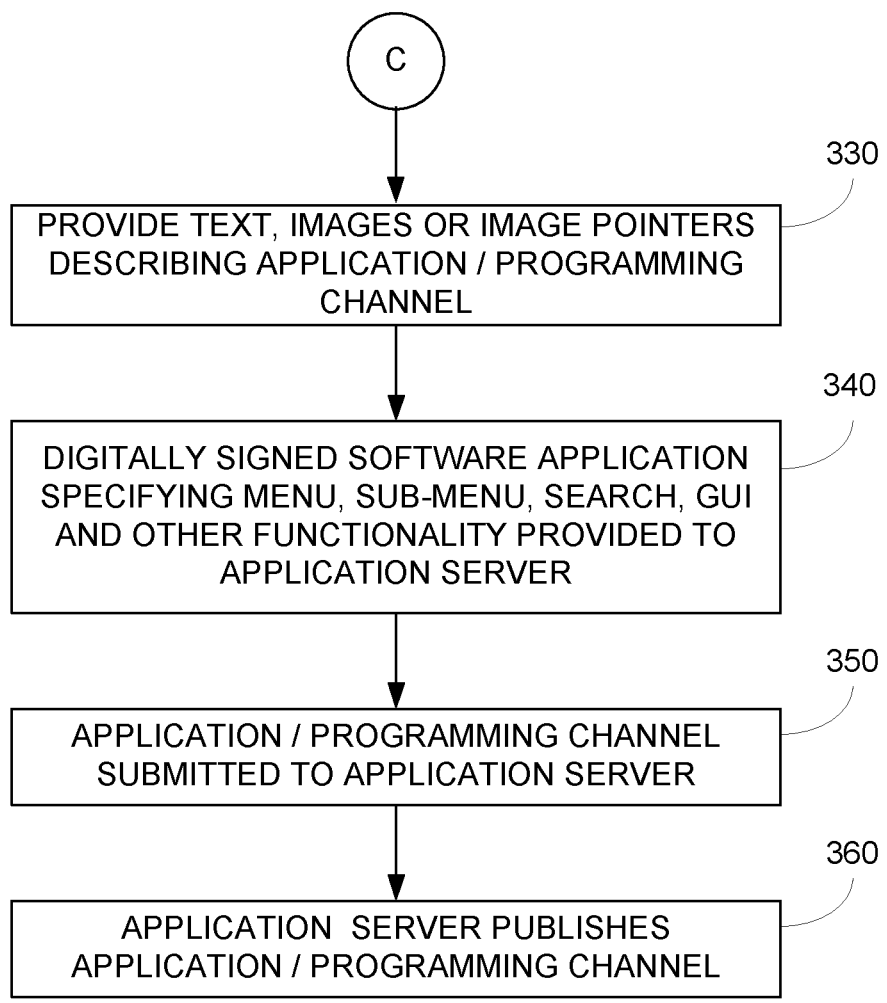

Turning to FIG. 2B, the video/application providers may specify URLs, images, pointers, or other graphical/textual data descriptions of their programming channel, or the like, step 330. In various embodiments, menus, sub-menus, query interfaces, and the like are also specified by the video/application providers, step 340. As mentioned above, the graphical user interface provided by the video/application provider along with menus, search bars, etc. may be implemented using API's provided by a SDK provided by the application server, or the like. Such API calls, as well as the URLs or pointers to sources of video programming, the hardware/software criteria, demographic criteria, image sources, and the like, may be specified in the form of a programming channel software package written by the video/application provider. That programming channel software package (channel application) is then uploaded to the application server as a programming channel, step 350.

In response to the software package, the application server may publish a version of the programming channel, step 360. In various embodiments, multiple versions of a programming channel may be enabled at the same time. The different versions may support different hardware and or software configurations. As examples of this, there may be a standard definition version for SPs having only SD support, a high definition version for SPs supporting HD video; one version of a game for SPs having a graphics accelerator, and another version of the game for SPs without a graphics accelerator; or the like. Subsequently, the application server may then use the provided criteria to determine which programming channels and which versions of the published programming channel are available to the SP, as described above, in FIGS. 1A-D.

FIG. 3 illustrates a block diagram according to various embodiments of the present invention. In particular, a typical consumer viewing environment 400 is illustrated including a consumer system 410, an application server 420, and one or more sources of video programming 430. In various embodiments, consumer system 410 includes a display (e.g. SD television, HD television) 440, an application client device (e.g. streaming player) 450 coupled to display 440 and to a network 460, and a user input device 470. As illustrated, application server 420 is coupled to client device 450 via network 460 and provides user (e.g. consumer) interfaces. In FIG. 3, video programming sources 430 may include a server 480 and a video storage 490.

In various embodiments, application server 420 includes one or more data stores, e.g. a database. The data stores may include data such as video programming software packages (including the network locations of video programming sources 430), hardware/software capabilities of different versions of streaming player 450, customer data (e.g. demographic, geographic, ISP, customer identifiable data, or the like.), or the like. In various embodiments, application server 420 generates and may output customized user interfaces for different streaming players 450. The user interfaces provide the user a selection of video programming channels that are currently available to the user, depending upon the hardware/software/demographic criteria, as described above.

In various embodiments, application server 420 receives user input from client device 450 and processes the input. In some cases, the user input may include navigation commands within the user interfaces, may include selection of one or more video programming sources to view, may include search terms, and the like.

In various embodiments, application client 450 displays user interfaces to a user on display 440. In response, a user utilizes user inputs device 470 (e.g. IR/RF remote control) to enter data, to make user selections from the user interfaces, or the like. In various embodiments, the user interfaces may be based upon data from application server 420, from video programming sources 430, and the like. Application programming interfaces (APIs) may be specified by application server 420 to enable proper generation of the user interfaces (e.g. via the video programming software packages), and to enable application client 450 to communicate with application server 420, or the like.

In various embodiments, video programming sources 430 may include server 480 and video storage 490. Network addresses of video sources 490 may be maintained in application server 420 (via video programming software packages) and provided to application client 450. Upon request of streaming player 450, video sources 490 may stream or otherwise output video data to streaming player 450. In some embodiments, application server 420 may provide or support one or more user interfaces, such as login user interfaces, search user interfaces of application client 450, or the like. Additionally, server 480 or application server 420 may process the return user input to determine an appropriate videos to provide to application client 450.

Figure 4:
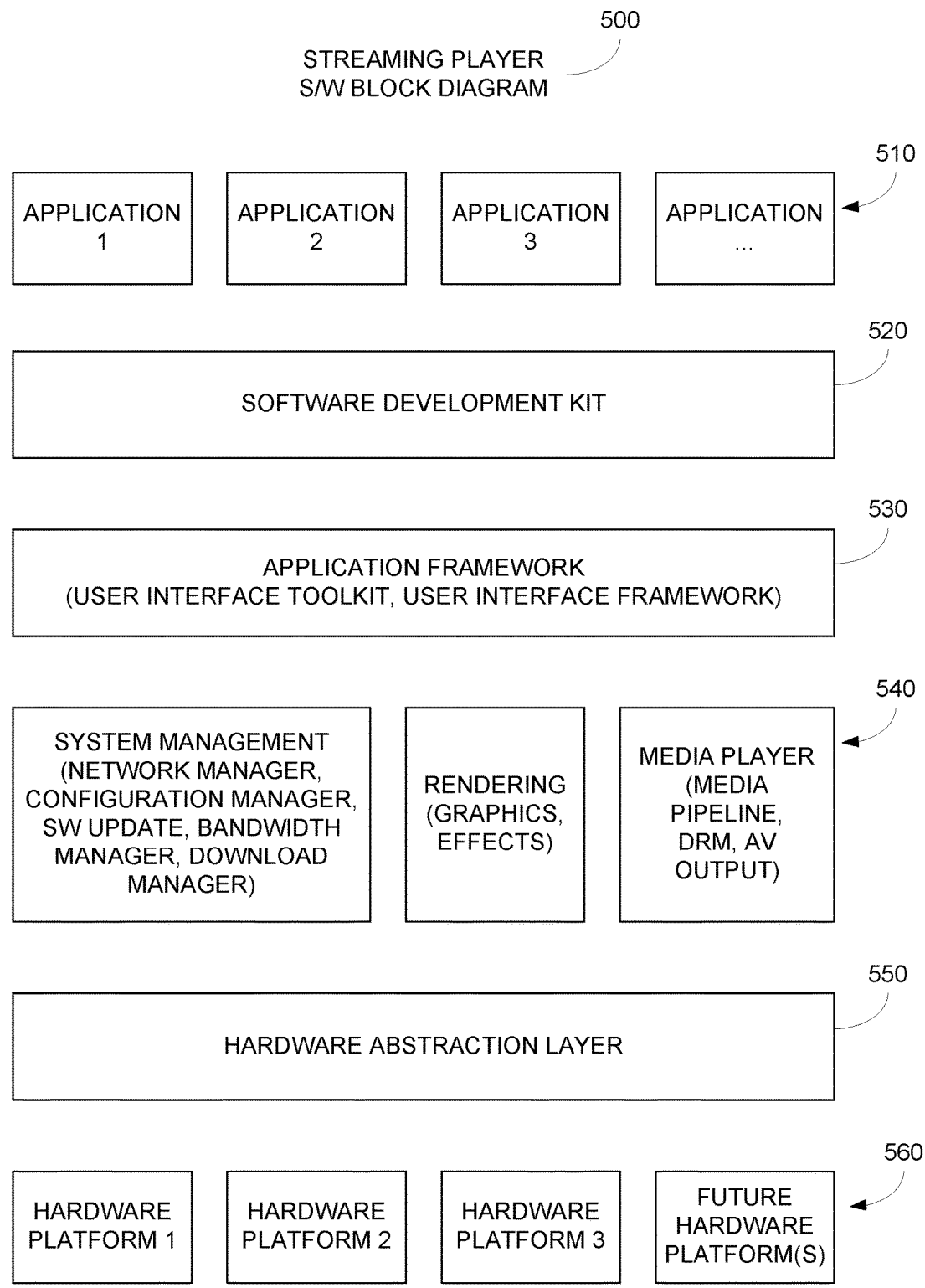
FIG. 4 illustrates a software block diagram of a system according to various embodiments of the present invention.

FIG. 4 illustrates a software block diagram according to various embodiments of the present invention. As illustrated in FIG. 4, a streaming player software block diagram 500 is illustrated having a number of layers. Layer 510 illustrate a number of applications that are executed upon the streaming player. As mentioned above, these applications may include games, screensavers, helper applications (e.g. Flash, or the like), and the like. In various embodiments, these applications are typically built upon a software development kit layer 520 and application framework 530. In various embodiments, the SDK and application framework may be provided by the assignee of the present invention, Roku. As mentioned above, video/application providers write their applications incorporating these software tools.

As illustrated in FIG. 4, system management, graphics and player functionality is provided in layer 540. In various embodiments, a number of management functions may be performed including wired or wireless network management, configuration management, software update management, consumption bandwidth management, software of application download management, and the like. Additional rendering graphics APIs are provided in this level. In various embodiments, rendering is performed according to OpenGL APIs, although in other embodiments, other graphics rendering standards may also be used, such as DirectX. In layer 540 a number of media player operations are performed as shown, including DRM related functionality.

A hardware abstraction layer 550 is also shown in FIG. 4, above the hardware layer 560. In various embodiments, as discussed above, some features within a specific hardware platform is may not abstracted, such the existence of a Bluetooth interface, SD card slot, USB interface, and the like. In general, it is desired that the hardware abstraction layer 550 can allow video/application programming to be executed upon many of the different hardware platforms.

Figure 5:
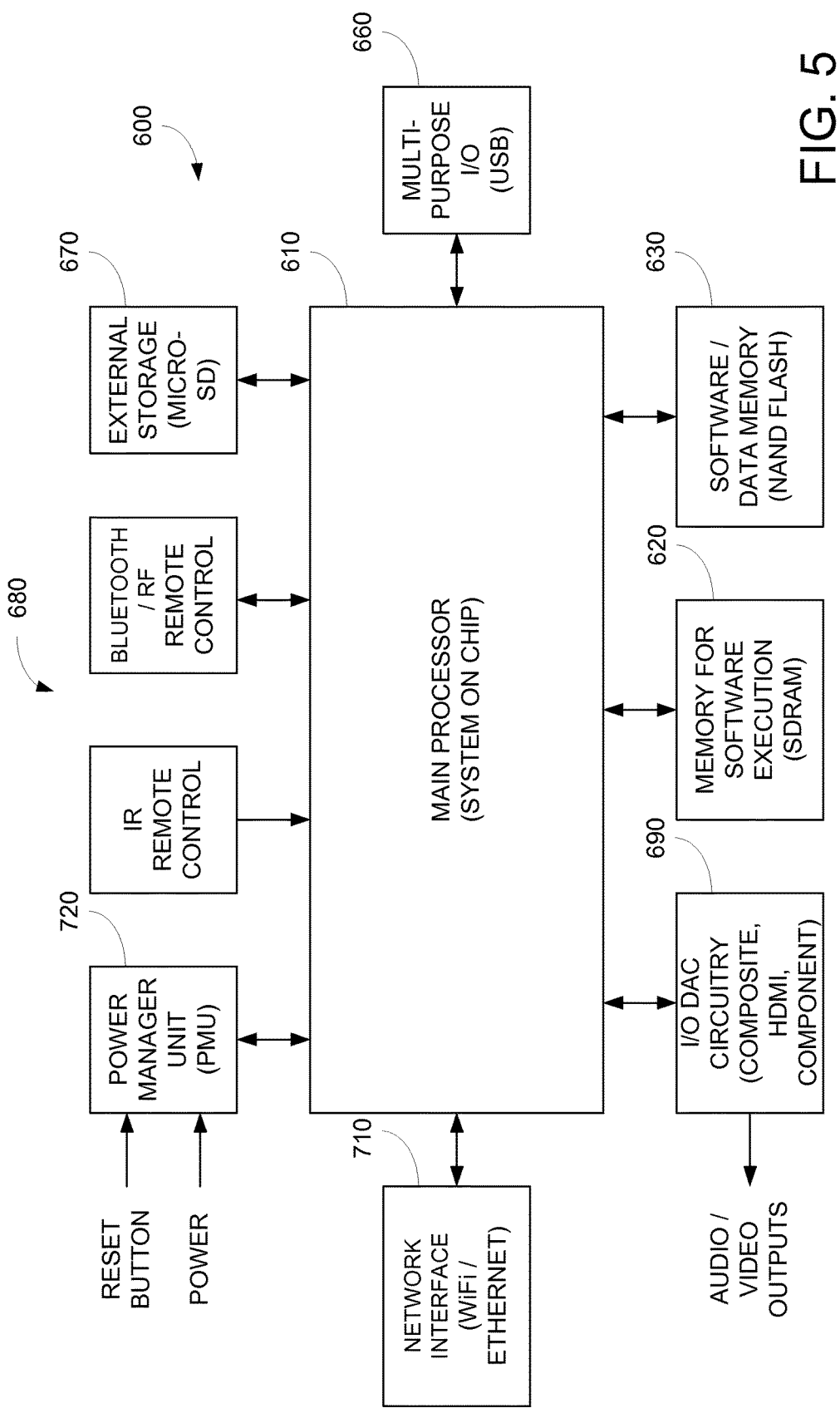
FIG. 5 illustrates a hardware block diagram of a system according to various embodiments of the present invention.

FIG. 5 illustrates a hardware block diagram of a system according to various embodiments of the present invention.

As illustrated in FIG. 5, a streaming media player 600 may be based upon a system on a chip (SOC) 610. In various embodiments, SOC 610 is a Nexperia NXP PNX8935 SoC, although in other embodiments, other SOCs, such as Tegra2 from NVidia, or the like, may also be used. In various embodiments, a central processing unit (CPU) and graphics processing unit (GPU) may be separate on separate physical chips.

In various embodiments, internal memories may include random access memory 620, flash memory 630, ROM 640. In a typical configuration, 512 MB of RAM 620 is provided, although in other embodiments, a greater amount of memory may be used. RAM 620 is typically used as a buffer for video/audio data, as a program memory, and the like. In various embodiments, flash memory 630 may be on the order of 1 MB or larger, and may be used to store downloaded programs or helper applications, images, and the like. Additionally, in various embodiments, ROM 640 may be on the order of 2 MB or larger, and is typically used to store firmware including executable code that instructs SOC 610 to perform operations, such as those described above. Additional memory and memory interfaces may be provided in various embodiments, to support memories such as a hard disk 650, a USB interface 660, an SD card slot 670, and the like. These memories may also be used for storage of applications, programs, buffered media, media, executable computer code, software keys, and the like.

In various embodiments, a user interface device 680 may be provided to enable wireless user input into streaming media player 600. Typically, user interface device 680 includes a number of buttons, or the like. In other embodiments, user interface device 680 may also include physical perturbation sensors (e.g. accelerometers, gyroscopes, pressure sensors, tilt sensors, magnetic sensors). In various embodiments, the user selection of the buttons and/or the input from the physical perturbations sensors are provided to streaming media player 600 via a wireless communication channel. Various communication channels are envisioned to be provided in various embodiments including infrared, Bluetooth, rf, WiFi, ZigBee and other near field communications mechanisms.

In various embodiments, SOC 610 typically includes a graphics processor or driver. Depending upon the specific SOC used in various embodiments, two-dimensional and three-dimensional graphics rendering may be supported. Additionally, in various embodiments, stereoscopic (e.g. three-dimensional video images) may be supported in some embodiments of the present invention. As illustrated in FIG. 5, any number of video output options may be provided to drive a video display 690. For example, in some embodiments, the outputs may include HDMI, RGB component video, S-video, DVI, VGA, composite video, and the like. In some embodiments, USB displays, or the like are also supported. As shown in FIG. 5, the video/audio output may be directly input to video display 690 or directed via one or more video switches.

As illustrated in FIG. 5, a number of network interfaces may be provided, such as Ethernet computer plug 700, wireless (e.g. WiFi) 710, and the like. In other embodiments, other more traditional television interfaces may also be supported, such as coaxial, digital TV antenna, and the like. In such embodiments, appropriate television tuning hardware may be included to acquire video from such sources.

FIG. 5 is representative of computer systems capable of embodying the present invention. It will be readily apparent to one of ordinary skill in the art that many other hardware and software configurations are suitable for use with the present invention. For example, the use of other processors, and the use of other graphics processing units (GPUs) are contemplated.

Further embodiments can be envisioned to one of ordinary skill in the art after reading this disclosure. For example, in some embodiments, if a SP does not have the hardware/software capability required for one or more additional programming channels, the application server may indicate a hardware/software upgrade is necessary (e.g. upsell message may be displayed). In various embodiments, a list, or the like of such programming channels may be desired.

In the above description, for sake of convenience herein, the term "video" was used in terms such as "video providers," "video storage," and the like. It should be understood that that term could be interchanged with the term "audio," "game," "screensaver," "utility," "application," and the like within the present patent application. For example, some programming channels may be audio channels (e.g. Pandora, BBC radio, Sirius, last.fm, or the like), some programming channels may be games (e.g. Sudoku, casino-style games, word games, seek and find, or the like), some programming channels may be screensavers (e.g. a flip clock).

In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope.

What is claimed is:

1. A method, comprising:
   receiving a hardware identifier associated with a streaming player at a server, wherein the streaming player is configured to receive on-demand services for display on a communicatively coupled video display;
   determining streaming player attributes based at least in part on the hardware identifier, wherein the streaming player attributes comprise a hardware or software configuration of the streaming player;
   determining demographic data based at least in part on the hardware identifier, wherein the demographic data is associated with a user of the streaming player;
   receiving criteria from a provider of available content, wherein the criteria specifies streaming player attributes and demographic data associated with providing the available content to the streaming player;
   selecting content for the user of the streaming player from the available content based at least in part on the determined streaming player attributes and the determined demographic data at least partially satisfying the criteria; and
   providing information associated with the selected content to the streaming player.

2. The method of claim 1, wherein the hardware identifier comprises at least one of a hardware revision identifier and a firmware revision identifier.

3. The method of claim 1, wherein the streaming player attributes comprise at least one of processor type, processor speed, memory capacity, port configuration, wireless capability, removable memory interface, and memory interface.

4. The method of claim 1, wherein the available content includes at least one of a software application, a video channel, an audio channel and a game channel.

5. The method of claim 1, wherein the demographic data comprises at least one of income, marital status, geographic location, internet service provider, political region, and purchasing habits.

6. The method of claim 1, wherein the information includes an image for each instance of the selected content.

7. The method of claim 1, further comprising supplying on-demand content in response to receiving a selection of content in the selected content.

8. The method of claim 1, wherein the determining the streaming player attributes further comprises:
   Retrieving the hardware or software configuration of the streaming player from a database using the identifier.

9. A system, comprising:
   a memory; and
   at least one processor coupled to the memory and configured to:
      receive a hardware identifier associated with a streaming player at the system, wherein the streaming player is configured to receive on-demand services for display on video a communicatively coupled display;
      determine streaming player attributes based at least in part on the hardware identifier, wherein the streaming player attributes comprise a hardware or software configuration of the streaming player;
      determine demographic data based at least in part on the hardware identifier, wherein the demographic data is associated with a user of the streaming player;
      receive criteria from a provider of available content, wherein the criteria specifies streaming player attributes and demographic data associated with providing the available content to the streaming player;
      select content for the user of the streaming player from the available content based at least in part on the determined streaming player attributes and the determined demographic data at least partially satisfying the criteria; and
      provide information associated with the selected content to the streaming player.

10. The system of claim 9, wherein the hardware identifier comprises at least one of a hardware revision identifier and a firmware revision identifier.

11. The system of claim 9, wherein the streaming player attributes comprise at least one of processor type, processor speed, memory capacity, port configuration, wireless capability, removable memory interface, and memory interface.

12. The system of claim 9, wherein the available content includes at least one of a software application, a video channel, an audio channel, and a game channel.

13. The system of claim 9, wherein the demographic data comprises at least one of income, marital status, geographic location, internet service provider, political region, and purchasing habits.

14. The system of claim 9, wherein the information includes an image for each instance of the selected content.

15. The system of claim 9, wherein the at least one processor is further configured to:
supply on-demand content in response to receiving a selection of content in the selected content.

16. A non-transitory, tangible computer-readable device having instructions stored thereon that, when executed by at least one computing device, causes the at least one computing device to perform operations comprising:
receiving a hardware identifier associated with a streaming player at the computing device, wherein the streaming player is configured to receive on-demand services for display on a communicatively coupled video display;
determining streaming player attributes based at least in part on the hardware identifier, wherein the streaming player attributes comprise a hardware or software configuration of the streaming player;
determining demographic data based at least in part on the hardware identifier, wherein the demographic data is associated with a user of the streaming player;
receiving criteria from a provider of available content, wherein the criteria specifies streaming player attributes and demographic data associated with providing the available content to the streaming player;
selecting content for the user of the streaming player from the available content based at least in part on the determined streaming player attributes and the determined demographic data at least partially satisfying the criteria; and
providing information associated with the selected content to the streaming player.

17. The computer-readable device of claim 16, wherein the identifier comprises at least one of a hardware revision identifier and a firmware revision identifier.

18. The computer-readable device of claim 16, wherein the streaming player attributes comprise at least one of processor type, processor speed, memory capacity, port configuration, wireless capability, removable memory interface, and memory interface.

19. The method of claim 1, wherein the receiving the hardware identifier further comprises;
receiving at least one of an electronic serial number hardware identifier or a firmware version number; and
wherein the determining the streaming player attributes further comprises determining the streaming player attributes based at least in part on the electronic serial number hardware identifier or the firmware version number.

* * * * *